United States Patent [19]
Whitlock

[11] Patent Number: 5,968,232
[45] Date of Patent: Oct. 19, 1999

[54] METHOD FOR AMMONIA PRODUCTION

[76] Inventor: David R. Whitlock, 64 Royal Rd., Belmont, Mass. 02178-2470

[21] Appl. No.: 08/898,299

[22] Filed: Jul. 22, 1997

Related U.S. Application Data

[63] Continuation-in-part of application No. 08/481,800, Jun. 7, 1995, Pat. No. 5,676,737, which is a continuation-in-part of application No. 08/027,890, Mar. 8, 1993, Pat. No. 5,470,377.

[51] Int. Cl.$^6$ ..................................................... B01D 53/04
[52] U.S. Cl. .................................. 95/90; 95/128; 95/148; 71/51; 423/237; 423/352
[58] Field of Search ........................... 71/51; 95/90, 128, 95/148; 423/237, 352

[56] References Cited

U.S. PATENT DOCUMENTS

| | | | |
|---|---|---|---|
| 4,537,760 | 8/1985 | Lavie | 95/128 X |
| 4,689,062 | 8/1987 | MacLean et al. | 95/128 X |
| 5,203,888 | 4/1993 | Maurer | 95/128 X |
| 5,470,377 | 11/1995 | Whitlock | 95/90 |
| 5,599,381 | 2/1997 | Whitlock | 95/90 |
| 5,676,737 | 10/1997 | Whitlock | 95/90 |
| 5,711,926 | 1/1998 | Knaebel | 95/128 X |

*Primary Examiner*—Robert Spitzer
*Attorney, Agent, or Firm*—John N. Anastasi

[57] ABSTRACT

A process for the separation of ammonia dissolved in a gaseous solvent is used to recover ammonia during the production of ammonia from a synthesis gas. The process may be used to extract and recover ammonia in either the supercritical region or the subcritical region. The process can be used to remove ammonia from synthesis gas, or other gaseous solvents, by removing ammonia whose chemical potential decreases as the density of the solvent increases. The process utilizes a sorbent to remove the ammonia followed by an in situ regeneration of the sorbent and recovery of the ammonia. Typically, a gaseous solvent containing the ammonia is passed through a bed of sorbent to sorb the ammonia onto the bed of sorbent, thereby producing a purified gaseous solvent. At least a portion of the gaseous solvent is then acted upon to increase its solvent capacity for the ammonia. The increased solvent capacity gaseous solvent is passed through the bed of sorbent in the opposite direction to desorb the ammonia from the bed of sorbent to provide an increased solvent capacity gaseous solvent. The ammonia may then be recovered from the increased solvent capacity gaseous solvent.

21 Claims, 3 Drawing Sheets

METHOD FOR AMMONIA PRODUCTION

CROSS-REFERENCE TO RELATED APPLICATION

This application is a continuation-in-part application under 35 U.S.C. §120 to U.S. Ser. No. 08/481,800 filed Jun. 7, 1995, now U.S. Pat. No. 5,676,737 issued on Oct. 14, 1997, and entitled Separation of Solutes in Gaseous Solvents, which is a continuation-in-part application under 35 U.S.C. §120 of U.S. Ser. No. 08/027,890 filed Mar. 8, 1993 and now U.S. Pat. No. 5,470,377.

BACKGROUND OF THE INVENTION

1. Field of the Invention

The present invention relates generally to a method and apparatus for ammonia recovery, and more specifically to such a method and apparatus for recovering pure ammonia from a gaseous solution.

2. Discussion of the Related Art

Ammonia is a major component of modern industrial fertilizer production. As disclosed in "Ammonia Catalysis and Manufacture," A. Nielson ed., Springer-Verlag Berlin Heidelberg, NY, N.Y. (1995), the most common industrial process for ammonia synthesis involves reforming a hydrocarbon fuel with air and steam to form a mixture of gaseous nitrogen and hydrogen in a 1 to 3 molar ratio. This gas mixture is then compressed to high pressure (e.g., about 80 bar to about 220 bar), heated (e.g., about 450° C. to about 550° C.) and passed over a catalyst where ammonia formation occurs. During ammonia synthesis, the reactants (i.e., nitrogen and hydrogen) and the product (i.e., ammonia) are in equilibrium, so, to increase the total amount of ammonia formed, the equilibrium should be shifted to product formation by removing ammonia from the reaction mixture as it is produced.

Removal of the ammonia is usually accomplished by cooling the gas mixture to a relatively low temperature (e.g., about −5° C. to about 25° C.). In this temperature range, a two-phase mixture is formed with ammonia being a liquid and nitrogen and hydrogen remaining as gases. The liquified ammonia is separated from the other components of the mixture, and the remaining nitrogen and hydrogen are subsequently re-heated to the operating temperature for ammonia conversion and passed through the reactor again.

There are two major disadvantages to this technique of ammonia isolation. First, the ammonia separation is often incomplete, so the gas that is recycled to the reactor can include a substantial amount of ammonia. This decreases the efficiency of ammonia production. Second, cost reduction for ammonia production by this method is limited by the fact that a substantial amount of the energy used in this process is related to cooling the gas mixture to separate ammonia.

A further complication with this method involves the presence of oxygen-containing species in the synthesis gas mixture during ammonia production. These oxygen-containing species, especially carbon monoxide, can poison the catalyst and reduce the efficiency of ammonia production. To remove the oxygen-containing species, they can be passed through a methanation catalyst prior to entering the ammonia synthesis loop. This converts the oxygen-containing species into inert species, such as methane, that are less likely to poison the catalyst. However, the resulting species dilute the reaction mixture which can decrease ammonia production capacity. To overcome this problem, the oxygen-containing species can be removed from the reaction mixture, but this increases the cost associated with ammonia production.

Distillation and single-stage flash are other methods that have been used to separate ammonia from a synthesis gas. However, similar to the above-noted technique, distillation and single-stage flash also involve the complexities associated with the separation of certain inert species from the reaction mixture.

U.S. Pat. No. 4,537,760 discloses a process for isolating ammonia from synthesis gas in which beds of sorbent are used to remove ammonia from a recycled synthesis gas subsequent to ammonia condensation. The ammonia is desorbed from the sorbent beds by the hot gases from the reactor. The desorbed ammonia is condensed at reduced temperature and phase separated as liquid. The sorbent beds are then regenerated by a counter current flow of a hot synthesis gas from the converter before a refrigeration and condensation step. While this process can improve the efficiency of ammonia production, this improvement is comparatively modest because the gases still must be cooled to a low temperature.

"Separation of Gases by Pressure Swing Adsorption," R. V. Jasra et al., *Separation Science and Technology*, volume 26(7), pages 885–930, (1991) and U.S. Pat. Nos. 2,944,627, 3,069,830, 3,237,377 and 3,237,379 disclose a method for gas purification known as pressure swing absorption. In this process, water vapor in high pressure air (e.g., 150 p.s.i.a.) is absorbed onto a sorbent in a bed, and then the bed is depressurized. A volume of dry air at low pressure is passed through the sorbent bed in the opposite direction to remove the adsorbed water from the sorbent bed. This process can be effective at drying air because the vapor pressure of the water sorbed onto the sorbent is nearly independent of the pressure of the air contacting the sorbent. While pressure swing absorption may be advantageously used in some systems, this process would be uneconomical in ammonia production due to the large volumes of synthesis gas recycled in ammonia production.

As seen from the foregoing discussion, it remains a challenge in the art to provide a method and apparatus for ammonia production and isolation that provides improved efficiency and reduced cost. In particular, it would be desirable to provide such a method and apparatus that could cut the cost and avoid the complexity of ammonia condensation. Furthermore, it would be advantageous if the method and apparatus could be performed without substantial temperature and/or pressure reductions.

SUMMARY OF THE INVENTION

In one embodiment, a process of the present invention includes providing a gaseous solvent containing ammonia. The gaseous solvent is passed through a bed of sorbent in a first direction and at a first density to sorb the ammonia from the gaseous solvent onto the bed of sorbent and produce a purified gaseous solvent. A portion of the purified gaseous solvent is acted upon to achieve a second density so that the portion of the purified gaseous solvent has an increased solvent capacity for the ammonia. An amount of the purified gaseous solvent is passed through the bed of sorbent in a direction opposite the first direction to desorb the ammonia from the bed of sorbent resulting in a gaseous solution having the gaseous solvent and the ammonia. The gaseous solution is then recovered.

In yet another embodiment, the process of the present invention includes providing a gaseous solvent having ammonia therein. The gaseous solvent is passed through a bed of sorbent to sorb the ammonia to the bed of sorbent and to produce a purified gaseous solvent. The purified gaseous solvent is then acted upon to increase a solvent capacity of the purified gaseous solvent for the ammonia. The increased solvent capacity purified gaseous solvent is passed through the bed of sorbent in the opposite direction to desorb the ammonia to produce a gaseous solution. The ammonia is then recovered from the gaseous solution.

In another embodiment, the process of the present invention includes providing a gaseous solvent containing ammonia. The gaseous solvent is passed through a bed of sorbent to sorb the ammonia onto the bed of sorbent and to produce a purified gaseous solvent. The purified gaseous solvent is acted upon to increase its solvent capacity for the ammonia. The increased solvent capacity purified gaseous solvent is passed through the bed of sorbent in the opposite direction to produce a purified gaseous solvent including the ammonia.

The present invention provides a process where gaseous species can be separated from a gaseous solvent. The present invention provides a process where ammonia can be separated and recovered from gaseous ammonia reactor products.

The present invention provides a process where a synthesis gas can be purified of ammonia to a high level.

The present invention provides a process where ammonia can be separated from the synthesis gas to high levels.

The present invention provides a process where unreactive gasses, such as argon and methane, can be separated from synthesis gas along with the ammonia.

The present invention provides a process where argon can be recovered from the synthesis gas.

The present invention provides a process where unreacted nitrogen and hydrogen can be recovered and recycled to the ammonia reactor.

The present invention provides a process for the production of nitrogen containing fertilizer through the improved production of ammonia followed by production of urea, nitric acid or ammonium nitrate.

DETAILED DESCRIPTION

The present invention relates to a method and apparatus for treating a gaseous solution that includes a gaseous solvent and one or more solutes. In particular, the method and apparatus can be used to remove one or more solutes from the gaseous solvent in a predetermined manner, thereby purifying the gaseous solvent and/or the gaseous solution. This purification occurs by a process that includes first adsorbing the solute(s) onto a sorbent bed. The pressure (and therefore the density) of the remaining gaseous solution is then increased, and at least a portion of this increased pressure gaseous solution is reverse flowed over the sorbent bed. This removes the solute(s) from the sorbent bed and regenerates the sorbent bed, so the process can be repeated using the same sorbent bed. In preferred embodiments, the gaseous solvent includes a synthesis gas mixture, and the solute is ammonia.

It is to be appreciated that one advantage of the separation process of the present invention is that the process utilizes the fact that a solute may be separated from a solvent if the chemical potential of the solute decreases as the density of the solvent increases. Thus, the process of the present invention may be employed in the supercritical region or the subcritical region. Specifically, in the present invention, the solute is separated from the gaseous solvent in a sorption column that includes one or more sorbent beds. Hence, in contrast to SCF processes such as disclosed in U.S. Pat. No. 4,434,028, the method of the present invention need not involve a two phase mixture.

The process of the present invention can be used to remove solutes from a gaseous solvent while at all times maintaining the fluid at conditions where it remains a solvent for the desired solute. The equilibrium effects that limit the effectiveness of the process described by Modell are used in the process of the present invention to produce the desired separation.

Similarly, the process of this invention can be used to separate different solutes with different affinities for the sorbent used, and methodologies for sorbent selection similar to those used in the chromatographic art can be used.

A "gaseous solution" as used herein denotes a solution wherein the solvent or the solution has significant compressibility.

By "gaseous solvent" it is herein meant to refer to a solvent with a significant compressibility.

As used herein, a "solute" or a "nongaseous solute" denotes a species whose thermodynamic chemical potential decreases with increased density of the gaseous solvent or solution.

In a gaseous solvent, the solubility of a solute increases with increased density of the solvent. Usually, the thermodynamic chemical potential of a pure solid or liquid is a very weak function of pressure, and so in a saturated solution where the gaseous solution is in equilibrium with pure solute the chemical potential of the solute in solution is also independent of pressure if the solution remains saturated. The chemical potential of a species in solution not at saturation is to a first approximation proportional to the fractional degree of saturation. When there is a difference in chemical potential of a species between two phases the species moves from regions of higher chemical potential to regions of lower chemical potential until the chemical potential is uniform. Thus, in an under saturated solution in contact with pure solute the solute dissolves until the solution is saturated. Similarly in a supersaturated solution solute precipitates.

When a mixture of gaseous species is isothermally compressed, the chemical potential of each of the gaseous species increases. In the case of water vapor in air, for example, the chemical potential increases until it exceeds that of liquid water and liquid water then precipitates. The vapor pressure of water (and the chemical potential) remains constant as total pressure increases and more water precipitates.

When a gaseous solution is isothermally compressed the chemical potential of the solvent gas increases, but the chemical potential of the nongaseous solute decreases. The solubility of a nongaseous solute increases with increased pressure and more solute must then dissolve to maintain the chemical potential of the solution. This phenomena is universally observed in the near super critical region and is commonly exploited during SCF processing.

If a solution of a gaseous solvent and a solute is maintained in equilibrium with a sorbent then the chemical potential of the solute on the sorbent and in the solution are equal. If the gaseous solution is isothermally compressed then the chemical potential of the solute in solution decreases and solute moves off the sorbent and into solution. If the solution is expanded, then solute moves out of solution and onto the sorbent. This behavior is opposite that observed with gaseous mixtures, and opposite that observed and utilized in pressure swing adsorption or heatless drying. Just as pressure swing absorption is a form of parametric pumping, so is the process of this invention. Solute is sorbed at low pressure and is desorbed at high pressure.

Regeneration of sorbents using supercritical fluids has been disclosed in U.S. Pat. Nos. 4,061,566, 4,124,528 and 4,147,624 as well as "Supercritical Fluid Extraction." These references discuss the removal of adsorbates from sorbent where the sorbents were first used to adsorb solutes from an aqueous solution, and a gaseous solvent is used to desorb the solute and then is treated to make the gaseous solvent a nonsolvent for the solute under consideration. While activated carbon can be regenerated with supercritical fluids, the adsorption of a solute can be substantial even in a dilute SCF solution. "Supercritical Fluid Extraction" presents data showing a loading of 0.2 g of alachlor (a synthetic pesticide) per gram of carbon at an alachlor concentration two orders of magnitude below saturation. Thus, this reference discloses that the regeneration expected by U.S. Pat. Nos. 4,061,566, 4,124,528 and 4,147,624 is limited due to equilibrium effects.

Figure 1:
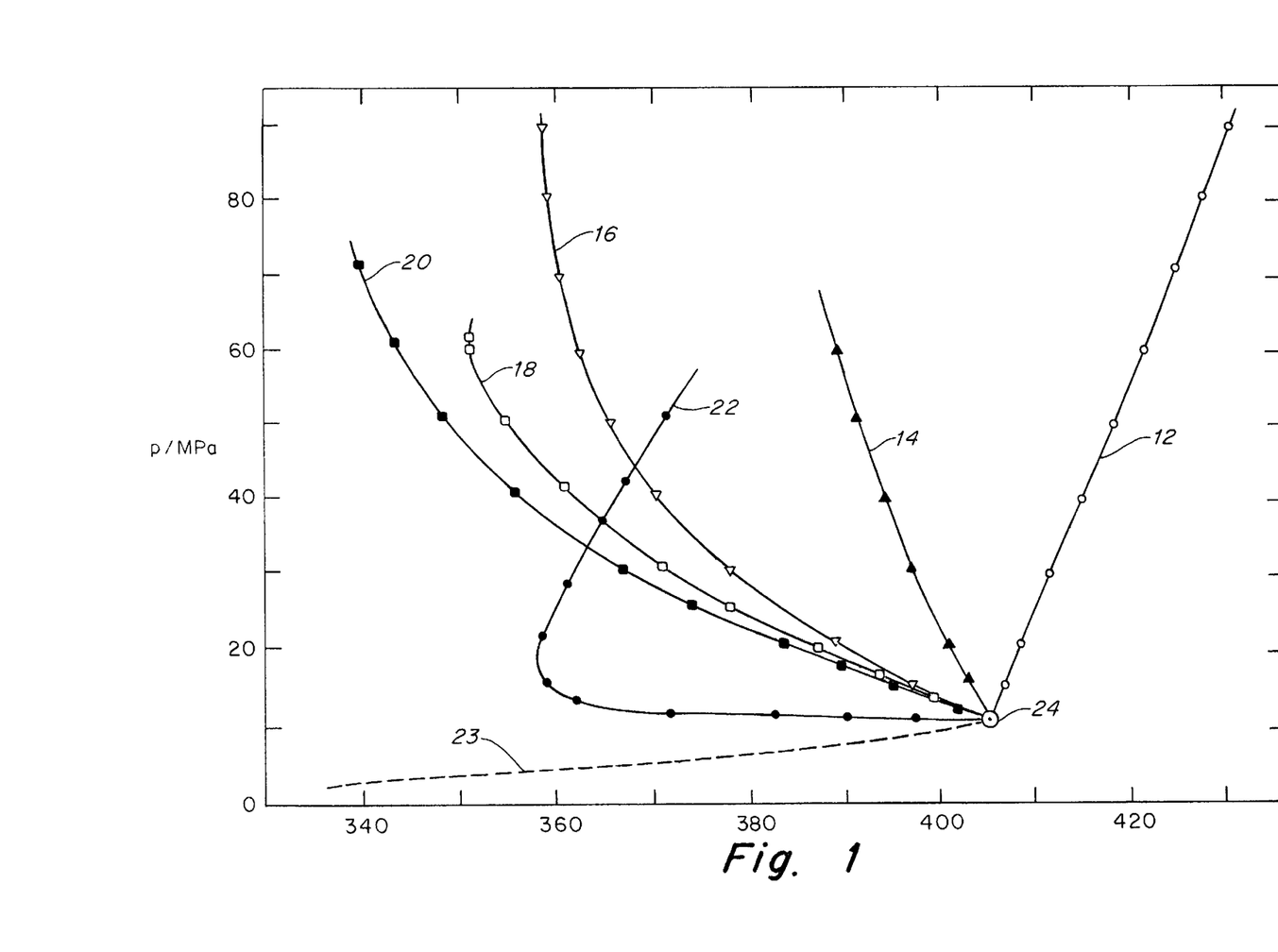
FIG. 1 is a graph illustrating a rear and ammonia critical point behavior of twelve binary mixtures containing ammonia.

The near critical behavior of mixtures of ammonia and a number of other species has been studied by numbers of researchers. FIG. 1 illustrates the critical locus for a number of mixtures in the region near the ammonia critical point (from Erwin Brunner, Fluid mixtures at high pressures VII. Phase separations and critical phenomena in 12 binary mixtures containing ammonia, J. Chem. Thermodynamics, 1988, 20, 1397–1409.) In particular FIG. 1 illustrates p(T) projections of the critical curves of six binary mixtures of (a substance+ammonia): where curve 12 is helium; curve 14 is hydrogen; curve 16 is nitrogen; curve 18 is argon; curve 20 is carbon monoxide; curve 22 is sulfur hexafluoride; where curve 23 is the vapor pressure of ammonia and point 24 is the critical point of ammonia. The critical locus is where the two phase mixture becomes single phase by virtue of the two phases becoming identical in composition and all other properties. To the left of the lines in FIG. 1, is a two phase mixture. At the critical point of ammonia the system is pure ammonia. As one moves away from the critical point of ammonia the ammonia content decreases. In observing the right most curve 12, that of ammonia and helium, the two phase region extends to regions of higher pressure and higher temperature than the critical point of all components. This system exhibits what is termed "gas-gas immiscibility."

Critical behavior was predicted by van der Waals based on the observation of longer range attractive forces and shorter range repulsive forces. Where these forces balance is called a critical point. The attractive force and the repulsive forces are short range. The attractive forces are associated with dipole interactions, dipole induced dipole, and induced dipole induced dipole interactions. The ultimate repulsive forces are due to the overlap of molecular orbitals when molecules approach each other closely, where the thermal energy provides sufficient kinetic energy to keep the molecules moving.

These interactions occur to some extent between all materials. Because the forces are very short range, the properties of a bulk fluid are not greatly influenced by the container it is in. However when the container has dimensions comparable to the range of interaction of these attractive and repulsive forces, the container can have a large impact on the behavior of the fluid, such as in a pore of molecular dimensions. This is an explanation for why gases can be adsorbed on surfaces. In the near critical region where the attractive and repulsive forces are nearly in balance, the presence of a surface can greatly influence the behavior of the fluid near that surface.

In the case of ammonia and helium, the presence of two gaseous phases above the critical temperature and pressure of both components indicates that energy associated with the attractive forces between the ammonia molecules is greater than the energy to overcome the repulsive forces between the helium atoms, and so the system energy is minimized by the formation of two gaseous phases. As the pressure is increased, and the ammonia molecules are brought closer together, more energy is needed to overcome the attractive forces, and so higher temperatures and higher molecular kinetic energies are needed to reach a critical point where the attractive and repulsive forces balance. Hydrogen molecules exhibit more attractive behavior than does helium, and so the critical locus is to the left of the helium line. The other gases exhibit even more, and so they are even farther to the left.

The curves in FIG. 1 are for two component mixtures. The critical locus for a three component mixture would lie between the critical loci for the two component mixtures. Thus the critical locus for an ammonia, argon, nitrogen mixture would lie between the ammonia-argon and the ammonia-nitrogen critical loci, the exact position would depend on the amounts of argon and nitrogen relative to ammonia.

Figure 2:
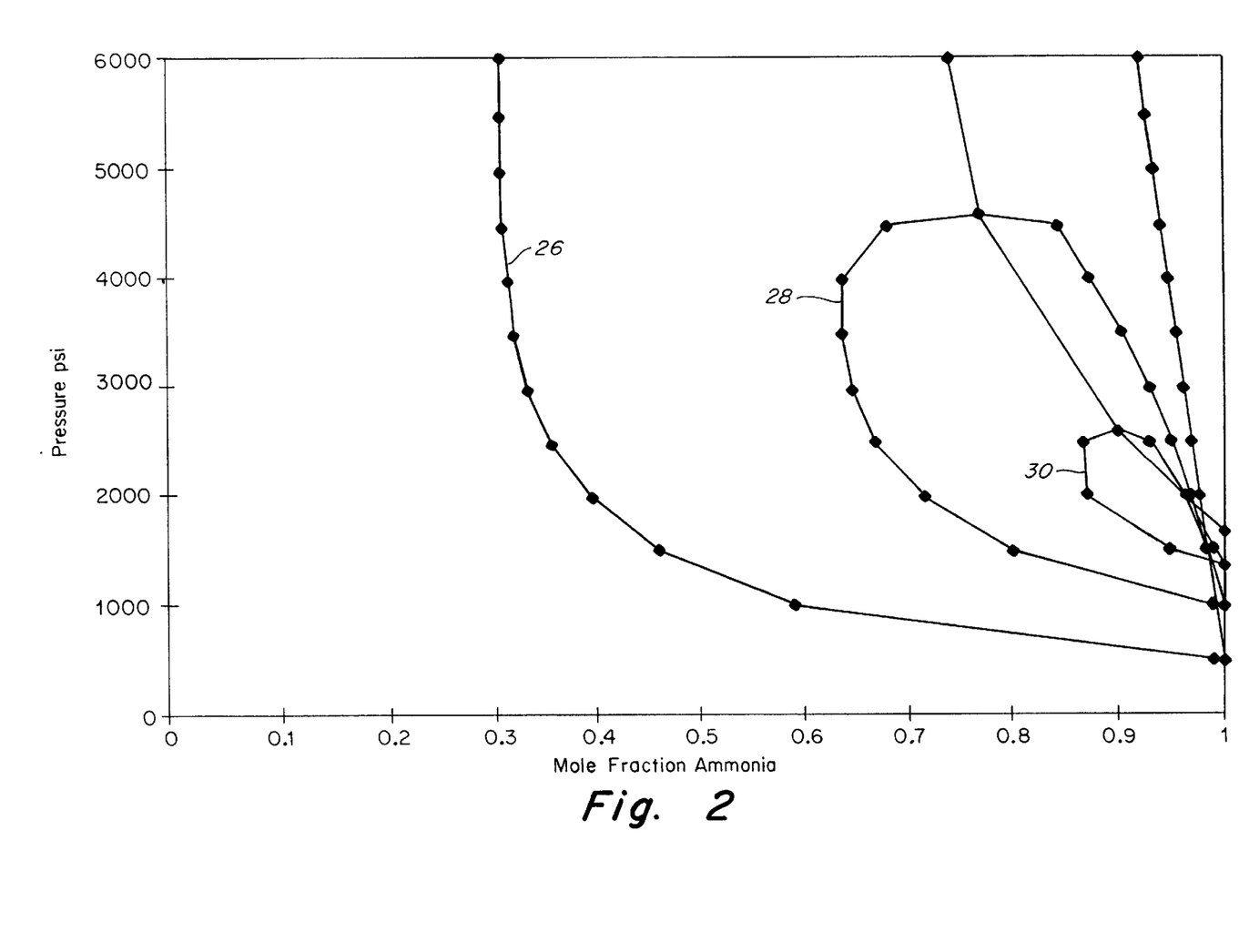
FIG. 2 is a graph illustrating a two phase envelope of an ammonia-nitrogen mixture for three different temperatures.

The defining criteria for a critical point is, that when approached from the two phase region, the two phases become more similar to each other as the critical point is approached, and at the critical point the two phases become identical. FIG. 2 illustrates a two phase envelope or in other words a plot of composition verses pressure for an ammonia-nitrogen mixture for three different temperatures. Data for the figure is from H. H. Reamer and B. H. Sage "Phase Behavior in the Nitrogen-Ammonia system", Journal of Chemical and Engineering Data, Vol. 4, No. 4, October 1959. The critical locus is seen to extend from the critical point of pure ammonia at its critical pressure to higher pressures at 41° C., 104° C. and 121° C. represented by curves 26, 28 and 30 respectively. The two phase envelope is shown for three different temperatures. The critical locus intersects the two phase line at the mixture critical. Inside the two phase envelope the composition of the liquid and vapor phases are determined from the lines tracing out the bubble point (right most curve) and the dew point (left most curve). As the critical point is approached by increasing the pressure, the two lines come together and meet at the mixture critical point. As the composition deviates from pure ammonia the critical locus extend to higher pressures, but lower temperatures. The lines of constant temperature trace out curves within which two phases coexist. At a given temperature and pressure these two phases are at equilibrium, in that the chemical potential of each species is the same in each phase.

In the subcritical region, the mixture divides into two phases. The compositions of the two phases are different, but must satisfy the Gibbs-Duhem relation, $x_1 dA_1 + x_2 dA_2 = 0$ where A is any intensive property of the system and x is mole fraction. See for example Modell and Reid, *Thermodynamics and its Application*, Prentice-Hall, 1974.

In the case of ammonia and nitrogen, the ammonia exhibits greater attractive behavior than does nitrogen, which explains the higher critical temperature of ammonia. Near the critical temperature of ammonia in the two phase region, the two phases present are a liquid phase rich in ammonia, and a gas phase with less ammonia. The compositions of the two phases can be read from FIG. 2 where the isotherm intersects a constant pressure line. As the pressure is increased, the compositions of the two coexisting phases become more similar, becoming identical at a critical point.

Near a surface of a material, such as in a pore, additional attractive forces are experienced so the two phase region is extended to higher temperatures and pressures, and over wider composition ranges. Only now the two phases are an adsorbed phase, near the surface, and a bulk phase, far from the surface. Thus a porous solid has at its surface a phase enriched in ammonia.

Consider the ammonia-nitrogen system at 104.4° C., and above 3500 psi. As the pressure is increased in this two phase region, it can be seen from curve 28 of FIG. 2 that the ammonia rich phase (liquid) becomes richer in nitrogen and the nitrogen rich phase (gas) becomes richer in ammonia until the two phases become identical at the mixture critical point. Thus increasing the pressure increases the ammonia content of the gaseous nitrogen rich phase, and increases the nitrogen content of the liquid ammonia rich phase.

In the present invention, the two species are separated by utilizing a pressure increase to increase the ammonia content of the gas phase. The ammonia rich phase is associated with the surface of the sorbent and stays fixed in position in the fixed bed of sorbent. The nitrogen rich phase is the bulk gaseous phase which is moved by the external pump. Ammonia is removed from the nitrogen rich phase at one pressure, by sorption onto a sorbent, and then removed from the sorbent at a higher pressure. Movement of the bulk fluid in opposite directions when the system is at different pressures results in separation.

Referring to FIG. 2, the phase diagram of the nitrogen-ammonia system, there are shown three isothermal lines 26, 28 and 30 in the two phase region. These isothermal lines all start at a point 24 (See FIG. 1) on the pure ammonia line at the vapor pressure of pure ammonia curve 23 (See FIG. 1) and expand in a tear-drop shape and intersect the critical locus at the uppermost horizontal part. These three lines are representative of a family of curves, all of the same shape. An important feature of these curves that allows for the operation of the present invention, is the region where increasing the pressure causes an increase in the ammonia content of the gas.

These curves are examples of behavior with two bulk phases present. In the presence of a sorbent, the behavior is similar, only now the ammonia rich phase is the adsorbed surface phase on the sorbent. The presence of a sorbent allows the coexistence of two phases over a larger range of mixture compositions. The exact position of the curve depends on the specific sorbent, but for typical physical sorbents such as, for example, silica gel where the ammonia rich phase is physically adsorbed, the approximate shape of the curve is the same.

In particular, in the case of a sorbent an important feature is that the ammonia content of the bulk gas adjacent to and in equilibrium with the sorbent increase in concentration as the pressure is increased. This is equivalent to the ammonia content of the adsorbed phase in equilibrium with the gas decreasing in ammonia content with increased pressure. This behavior is observed in the two phase ammonia-nitrogen system. The liquid composition is traced out as the bubble point curve 28 which is seen to increase in nitrogen content continuously from pure ammonia at its vapor pressure up to the mixture critical pressure. Above 3500 psi on the 104 C isotherm(curve 28), as the pressure is increased the ammonia content of the gas in equilibrium with the liquid increases.

In the ammonia, non-ammonia systems of interest for separating ammonia from synthesis gas for use with the method of the present invention, the non-ammonia species are all much more volatile than ammonia. In other words the more volatile species have smaller attractive forces between molecules.

In the adsorbed phase the ammonia exerts some attractive forces on other ammonia molecules and so the condensed phase is more concentrated in ammonia than the gas phase. At the condensed phase, either ammonia rich liquid phase or ammonia rich adsorbed surface phase becomes more dilute in ammonia, the average attractive force exerted between ammonia molecules becomes smaller. Thus as the condensed phase becomes more dilute in ammonia it becomes easier to force more non-ammonia species into the condensed phase by increasing the pressure. Thus as the condensed phase becomes more dilute in ammonia increasing the pressure has a larger influence on the concentration, and produces a larger reduction in ammonia concentration. This is apparent in the ammonia-nitrogen system in the near critical region as shown in FIG. 2.

The adsorbed ammonia rich phase can be quite compressible, and during a pressure increase the increase in density can result in an increase in the ammonia concentration, that is ammonia per unit volume, and still a decrease in the mole fraction of ammonia. In cases such as this it can be useful to increase the temperature of the system during the regeneration of the sorbent with higher pressure.

Conventional distillation as discussed above operates in the two phase region where bulk gas and bulk liquid phases are in equilibrium. The present invention is not limited to regions of the phase diagram where two bulk phases are present. The two phases can be a fluid phase and an adsorbed phase.

An advantage of the present invention over distillation, is that to generate reflux in a conventional distillation column a portion of the gaseous column overhead gas must be condensed to form liquid reflux. In the present invention, reflux is generated by increasing the pressure, and the condensing of gas to liquid is not necessary.

In the present invention a mixture of ammonia and synthesis gas is passed through a bed of sorbent at one pressure. A mixture of ammonia and synthesis gas collects on the surface of the sorbent and remains in the bed. The ammonia content of this adsorbed phase is higher than the bulk gas phase in contact with it. The pressure is then increased. The composition of the sorbed fluid shifts to a lower ammonia content, and the bulk fluid surrounding the sorbent increases in ammonia content.

The fluid mixture that is on the sorbent has an ammonia that is higher than the bulk gas phase in equilibrium with it. The more volatile non-ammonia species are at lower concentrations than in the bulk gaseous fluid. The relative volatility of the different species depends upon their individual properties in combination with ammonia. A mixture of three components, ammonia, hydrogen, and nitrogen can be treated as a binary mixture of two pseudo fluids, ammonia-nitrogen and ammonia-hydrogen. As more species are added to the mixture, the relative partitioning of the species between the gas and the adsorbed phase approximately follows the critical conditions of the ammonia-non-ammonia species. In FIG. 1 critical loci for various ammonia-non-ammonia mixtures are sketched. In the figure the two phase region is to the left of the line. Thus on increasing the temperature, the mixture begins as two phase and becomes single phase. The helium-ammonia mixture requires the highest temperature to become single phase. Consider the curves for argon 18, nitrogen 16 and hydrogen 14. The curve 16 for nitrogen is found between the curves 14, 18 for argon and hydrogen. In the adsorption of ammonia rich fluid from a mixture of these other three, the relative volatility approximately follows this order also. Thus hydrogen is relatively more enriched in the gas phase than the other two while argon is relatively more enriched in the adsorbed phase.

Similar results were obtained by Carlo G. Alesandrini, et. al., in "Calculation of Vapor-Liquid Equilibria for the System $NH_3$—$N_2$—Ar—$CH_4$", Ind. Eng. Chem. Process Des. Develop., Vol. 11, No. 2, 1972, pp. 253–259. In table V of this work is calculated the relative volatilities of these components at 200 Atm and 300 K. The relative volatilities for the components are: $NH_3$ 0.082, $H_2$ 65.0, $N_2$ 52.4, Ar 30.7, and $CH_4$ 15.1. The calculation of the relative volatility of each of these components was for two bulk phases in equilibrium at a temperature far below the critical temperature. As the critical point is approached, the liquid and gas phases become more and more similar, and the relative volatilities become more and more alike. At the mixture critical point the two phases become identical and the relative volatility of all species become equal to 1. At that point the relative volatility of all components become equal to 1.0. However, the relative volatility of hydrogen approaches 1 slower than the other components. It is desirable to operate in regions where the relative volatility of methane and argon is close to 1 and where the relative volatility of nitrogen and hydrogen is larger than 1. In that regime the argon and methane can be separated with the ammonia.

The critical locus can also be described as the region where the relative volatility of all species in a mixture of two bulk phases becomes equal to 1.

Referring to curve 28 the 104° C. isotherm in FIG. 2, as the pressure is increased, the liquid (right line) declines in ammonia content. The gas first declines, and then increases to meet the liquid line at the mixture critical point. The liquid is mostly ammonia. The interactions of the non-ammonia species in the liquid are mostly determined by interactions with the ammonia because ammonia is the majority species. If a sorbent were exposed to a nitrogen-ammonia mixture a mixture of ammonia and nitrogen would adsorb onto the sorbent.

The attractive forces between molecules are of short range. Ammonia is preferentially sorbed onto the sorbent because of ammonia's higher boiling point compared to nitrogen and the attractive forces exerted by the pore surface. The absorption of non-ammonia species by the adsorbed layer of ammonia is related to the temperature and pressure and the sorbent. The physical adsorption of a layer of ammonia-rich fluid on the sorbent allows for the partitioning of non-ammonia species into this layer and thus onto the sorbent.

The relative volatility of a species depends on the composition of the two phases present. As discussed above, as the critical point is approached, the two phases become more similar, becoming identical at the critical point. In addition, the relative volatility of all species between two bulk phases approaches 1.0 as the bulk critical point of the mixture is approached. However, in a pore such as a sorbent, the fluid is confined to the surface, and is enriched in the most highly sorbed component. In contrast, in the bulk the liquid is free to expand and is not constrained. In the bulk, during the approach to critical conditions, the expansion of the bulk liquid due to increased non-ammonia species affects the relative volatility of the species such that all relative volatilities approach 1. However, in a pore the adsorbed phase does not necessarily have this same composition, and so the relative volatilities of the different species present does necessarily approach 1.0 as the bulk critical point is approached.

Ammonia is sufficiently less volatile than the other species normally present in synthesis gas, namely, hydrogen, nitrogen, argon, and methane. Ammonia will be the main constituent of the adsorbed phase. The relative volatilities of the other species will follow the same order as their respective relative volatilities in the near critical two phase region, but the exact numerical values will depend on the specific sorbent chosen.

The present invention can thus use a process complementary to pressure swing absorption where a gaseous solution is purified by adsorption onto a sorbent bed, and then by increasing the pressure and reversing the flow over the sorbent bed the gas can be regenerated. Increasing the temperature during the regeneration step can further enhance the efficiency.

Figure 3:
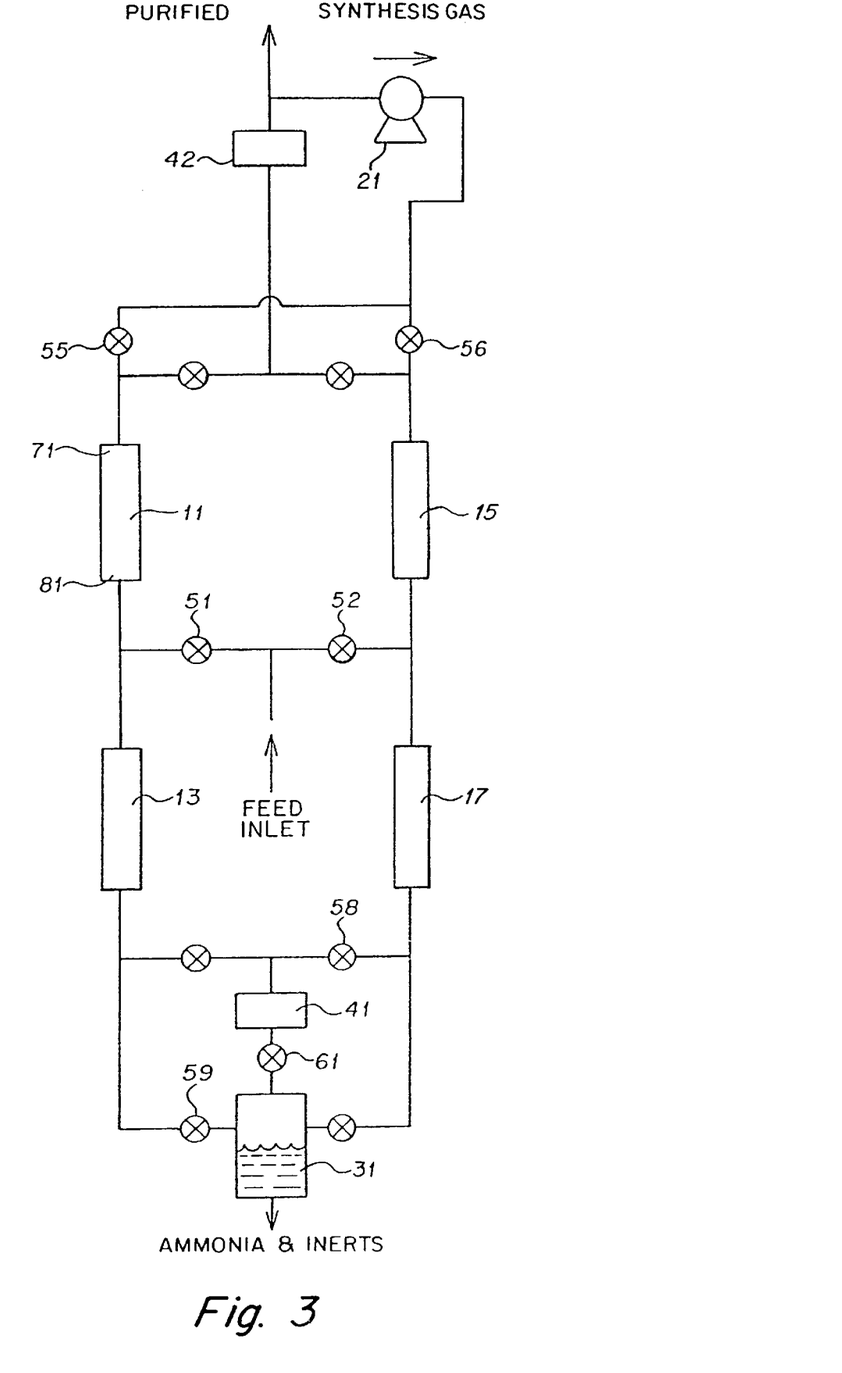
FIG. 3 is a schematic view of a portion of an apparatus according to the present invention.

Consider the apparatus of FIG. 3 which can be used to process a feed of nitrogen gas containing ammonia. As a first example consider a sorbent media that merely traps and holds a liquid phase. If a feed containing 70% ammonia and 30% nitrogen (refer to curve 28 of FIG. 2) at 3500 psia and 104° C. is caused to flow in the bottom (81) of and through adsorption column 11 which is packed with a suitable sorbent, a liquid phase containing 90% ammonia will separate and be held by the sorbent and a gas containing 65% ammonia will continue up through the column 11 and will leave at the top (71). If 1000 moles of mixture is passed through, then 22.86 moles of ammonia (90%) will be retained on the sorbent along with some 2.286 moles of nitrogen (10%). At the base 81 of the bed where the feed first contacts the sorbent, the sorbent becomes loaded until the chemical potential for ammonia is that of the incoming fluid.

The feed flow is now diverted by closing valve 51 and opening valve 52 to adsorption column 15, and pump 21 is activated to pressurize adsorption columns 11 and 13 through valve 55 from 3500 to 4500 psia. The equilibrium liquid phase composition is now 80%, and the gas phase is 75% ammonia so ammonia desorbs from the sorbent. Pump 21 continues to pump, and fluid with 75% or more ammonia continues to move down into column 13. Thus the gas moved upward has an ammonia content no greater than 65%, that in equilibrium with liquid at 3500 psi while the gas moving down has an ammonia content no less than 75%, that in equilibrium with liquid at 4500 psi. Thus there is a net downward movement of ammonia and a net upward movement of nitrogen. The net transport of ammonia and nitrogen is limited by the compositions of the liquid and vapor phases at the two different pressures.

When the fluid containing ammonia reaches pressure control valve 61, the pressure is reduced to 3500 psi, then two phases are formed and the liquid collects at the bottom.

The vapor now passes up through column 17 where it meets fresh feed at column 15.

If the sorbent is chosen such that not only droplets of liquid were trapped, but ammonia could be sorbed from a single phase mixture, then the net transport of nitrogen and ammonia could be extended into the single phase region where the two phases present are the fluid phase and the adsorbed surface phase.

In a preferred embodiment of the process and apparatus of the present invention a sorbent such as, for example, silica gel is chosen which can physically adsorb ammonia onto its surface from a gaseous stream that is far from saturation. Thus, ammonia reactor effluent is used as a feed, at essentially reactor effluent pressure. The temperature is selected to operate in the region where increasing the pressure causes an increase in the ammonia content of the gas in equilibrium with the condensed ammonia rich phase. Operation in the near critical temperature is satisfactory. The feed is fed through valve 51 and into vessel 11. Ammonia sorbs out onto the sorbent and at region 71, essentially all the ammonia has been removed from the synthesis gas.

The synthesis gas which is depleted in ammonia is now compressed in compressor 21 and fed back through valve 56 into vessel 15 where the compressed synthesis gas desorbs the ammonia from the sorbent. The ammonia sorbed on the sorbent also is relatively enriched in the gaseous components of lesser volatility, including argon and methane. Upon desorption, these gasses also desorb. The desorbed ammonia and the desorbed inert components pass down through the column, and through valve 58 and pressure control valve 61 and into disengaging vessel 31. Any liquid phase is collected and removed as liquid ammonia in the vessel. Any vapor present disengages from the liquid and passes through valve 59 and up through vessel 13 where ammonia is sorbed out on the sorbent. The gas, partially depleted in ammonia passes up through and into vessel 11 where it joins with fresh feed entering the vessel.

Thus, the operation of the apparatus can be summarized as during the passage of the fluid up through the sorbent containing vessels, the ammonia and lesser volatile gaseous species are held by the sorbent and their movement retarded. During the passage of the fluid down through the vessels at higher pressure, the ammonia, argon and methane are desorbed from the sorbent and transported downward. The apparatus of FIG. 3 includes component detectors 41 and 42 that are used to determine the breakthrough of ammonia and other species and so to control the switching of the valves and the compressor.

Heating the fluid after it has been compressed can improve the desorption of ammonia from the sorbent in the top of column 11 at region 71. Only a portion of the gas that exits the column is used for regeneration, so the heat that is added is readily carried away during the sorption step of the process. Heating of the fluid per se may not be actually necessary. The adiabatic compression of the gas will cause a rise in temperature and the uncooled gas can be used.

As discussed above, operation of the process of the present invention in the near critical region is desired. This is where the relative volatility of the inert species argon and methane are such that they can be removed with the ammonia while retaining the hydrogen and nitrogen in the process. Removing the ammonia and inerts together can reduce the inert content of the recycle stream and increase the ammonia production rate of an existing ammonia plant.

It is to be appreciated that ammonia produced from this process can be used as fertilizer, either directly or after being combined with other ingredients. In addition, a partial oxidation of ammonia can be used to generate nitric acid and upon combination with more ammonia, ammonium nitrate can be formed. Urea can also be formed from this ammonia.

The ammonia exiting vessel 31 can contain all of the argon and methane removed from the synthesis gas. The argon can be recovered as a concentrated argon stream for use as a purified argon product. It may also be desired to remove a portion of the gas present in vessel 31 to purge the argon and methane from the ammonia stream.

The argon rich stream can be cooled and purified and used as a source of argon.

A final temperature of the process of the present invention will likely be such that the ammonia can be stored as cryogenic liquid at substantially atmospheric pressure. The process of the present invention thus reduces the need for refrigeration to only that of cooling the ammonia stream. Thus an advantage of the method and apparatus of the present invention is that the ammonia condensation can occur at higher temperatures where heat can be rejected more easily. In addition cooling of the unreacted synthesis gas is not necessary.

Sorbent selection is important, but not critical. The sorbent must sorb the solute, and must be resistant to the fluids and temperatures used. Sorbents such as zeolites, activated carbon, molecular sieves, (organic and inorganic), silica gel, activated alumina, and polymeric adsorption resins are well known sorbents and can be used in the present invention. Prior art useful in the selection of suitable sorbents is the chromatographic art where solids as well as liquids on solid supports are commonly used as sorbents. Liquids can be used as sorbents, but substantial complexity involving multiple pumps is encountered unless the liquid is held on a solid support. Also rapid mass transfer requires high interfacial area and short diffusion paths, especially in any liquid phase, which is difficult to achieve without a solid support.

Some of the desirable properties for a sorbent may include reversible sorption, stability over many sorption-desorption cycles, selectivity (for solute-solute separation), low cost, and rapid mass transfer properties.

High sorption capacity is not especially important. The fraction of fluid that must be compressed and used for regeneration is a function of chemical potential and thermodynamic equilibrium effects of the solvent-solute system, and not a function of the sorbent capacity. The sorbent capacity will affect the time between regeneration cycles, but not the ratio of product to regenerant. A high sorbent capacity will allow longer cycles and smaller sorption beds. The cycle length may be important for other considerations, for example the fatigue life of cycling pressure vessels. The volume of fluid to be compressed, the flow rate, the capital and operating cost of the compressor are nearly independent of cycle length (neglecting sorbent bed void volume). A large system would likely use a multiplicity of columns so the compressor would be operating continuously, and the cycling achieved by valves.

Relative sorbent capacities for different solutes, or selectivity is important for solute-solute separation, where the relative sorption capacity of a bed for a particular solute determines the breakthrough order. Parametric pumping is a well known technique that has been well studied theoretically, and which theory allows for the rational selection of sorbents and the estimation of separation per cycle.

Having thus described certain embodiments of the present invention, various alterations, modifications and improvements will readily occur to those skilled in the art. Such alterations, modifications and improvements are intended to be within the scope of the invention. The materials used as well as their shapes and dimensions may be any required. Accordingly, the foregoing description is by way of example only and is not intended as limiting. The invention is limited only as defined in the following claims and the equivalents thereto.

What is claimed is:

1. A process for separating ammonia from a gaseous solvent under conditions where a chemical potential of the ammonia dissolved in the gaseous solvent decreases as the density of the gaseous solvent increases, the process comprising the steps of:

passing the gaseous solvent containing the ammonia, the gaseous solvent being at a first density, through a bed of sorbent in a first direction so as to sorb the ammonia from the gaseous solvent onto the bed of sorbent while producing a purified gaseous solvent reduced in concentration of the ammonia;

acting upon a portion of the purified gaseous solvent so as to achieve a second density so that the portion of the purified gaseous solvent has an increased solvent capacity for the ammonia;

passing an amount of purified gaseous solvent at the second density through the bed of sorbent in a second direction opposite the first direction so as to desorb the ammonia from the bed of sorbent producing a gaseous solution of the ammonia dissolved in the amount of purified gaseous solvent, the amount of purified gaseous solvent at the second density being selected from the group consisting of the portion of the purified gaseous solvent at the second density and a purified gaseous solvent at the second density which is supplied from outside the process; and recovering the gaseous solution of the ammonia dissolved in the portion of purified gaseous solvent to form a recovered portion of the gaseous solution.

2. The process according to claim 1, further comprising the additional steps of:

acting upon the recovered portion of the gaseous solution so as to decrease a density of the recovered portion of the gaseous solution to provide the recovered portion of the gaseous solution at the first density;

allowing the recovered portion of the gaseous solution at the first density to approach phase equilibrium and form a more concentrated ammonia phase and a more dilute solvent phase;

separating the more concentrated ammonia phase from the more dilute solvent phase; and recovering the more concentrated ammonia phase and passing the more dilute solvent phase at the first density through the bed of sorbent.

3. The process according to claim 2 wherein the recovered more concentrated ammonia is used to make nitrogen containing fertilizer.

4. The process according to claim 3 wherein the nitrogen containing fertilizer contains a component selected from the group consisting of ammonium sulfate, ammonium phosphate, ammonium nitrate, urea, calcium nitrate, and potassium nitrate.

5. The process according to claim 2, wherein the recovered more concentrated ammonia also contains argon and methane.

6. The process according to claim 5, further comprising the step of separating the argon and methane from the recovered more concentrated ammonia.

7. The process according to claim 1, wherein the amount of the purified gaseous solvent is the portion of the purified gaseous solvent at the second density.

8. The process according to claim 1, wherein the amount of the purified gaseous solvent is the purified gaseous solvent at the second density which is supplied from outside the process.

9. The process according to claim 1, wherein a pressure of the portion of the purified gaseous solvent is increased to change a density of the portion of the purified gaseous solvent between the first density of the purified gaseous solvent and the second density of the purified gaseous solvent.

10. The process according to claim 1, wherein the gaseous solvent is selected from the group consisting of helium, nitrogen, argon, methane, krypton, xenon, neon, hydrogen, air, and mixtures containing 1 or more of these components.

11. The process according to claim 1, wherein the bed of sorbent includes a sorbent selected from the group consisting of activated carbon, activated alumina, zeolite, chromatographic support, metal oxides, silica gel, molecular sieves, liquid on a solid support, aerogels, metal salts, polymeric adsorption resins and mixtures thereof.

12. The process according to claim 1, wherein the acting step includes increasing the pressure of the purified gaseous solvent.

13. The process according to claim 12, wherein the pressure of the purified gaseous solvent is increased from about 2200 pounds per square inch to about 2500 pounds per square inch.

14. The process according to claim 1, wherein said step of passing the gaseous solvent includes passing the gaseous solvent at the first density that is below a critical pressure of the gaseous solvent.

15. The process according to claim 1, wherein said step of passing the gaseous solvent includes passing the gaseous solvent at the first density that is above a critical pressure of the gaseous solvent.

16. A process for separating ammonia from a gaseous solvent under conditions where a chemical potential of the ammonia dissolved in the gaseous solvent decreases as the density of the gaseous solvent increases, the process comprising the steps of:

passing the gaseous solvent containing the ammonia through a bed of sorbent in a first direction so as to sorb the ammonia onto the bed of sorbent, thereby producing a purified gaseous solvent;

acting upon the purified gaseous solvent to increase a solvent capacity of the purified gaseous solvent for the ammonia to produce a volume of an increased capacity gaseous solvent;

passing an amount of increased capacity gaseous solvent through the bed of sorbent in a second direction opposite the first direction so as to desorb the ammonia from the bed of sorbent to produce a gaseous solution including the ammonia, the amount of increased capacity solvent being selected from the volume of increased capacity solvent and an increased capacity solvent supplied from outside the process; and recovering the ammonia from the gaseous solution.

17. The process of claim 16, further comprising a step of monitoring the purified gaseous solvent.

18. The process of claim 16, further comprising a step of monitoring the gaseous solution.

19. A process for separating ammonia from a gaseous solvent under conditions where a chemical potential of the ammonia dissolved in the gaseous solvent decreases as the density of the gaseous solvent increases, the process comprising the steps of:

passing the gaseous solvent containing the ammonia through a bed of sorbent in a first direction so as to sorb the ammonia onto the bed of sorbent and to produce a purified gaseous solvent;

acting upon the purified gaseous solvent so as to increase a solvent capacity of the purified gaseous solvent for the ammonia, to produce an amount increased capacity gaseous solvent; and passing a volume of increased capacity gaseous solvent through the bed of sorbent in a second direction opposite the first direction to produce a second gaseous solvent including the ammonia, the volume of increased capacity gaseous solvent being selected from the group consisting of the amount of increased capacity gaseous solvent and an increased capacity gaseous solvent supplied from outside the process.

20. The process according to claim 19, further comprising a step of recovering the ammonia from the second gaseous solvent.

21. The process of claim 19, further comprising the step of recovering the purified gaseous solvent.

* * * * *